United States Patent [19]
Bretschneider et al.

[11] Patent Number: 6,076,836
[45] Date of Patent: Jun. 20, 2000

[54] SEALING SYSTEM FOR A CLOSING FLAP ON A PASSAGE ORIFICE

[75] Inventors: Frank Bretschneider, Liegau-Augustusbad; Willibald Kühnemund, Dresden, both of Germany

[73] Assignee: Glatt Systemtechnik Dresden GmbH, Dresden, Germany

[21] Appl. No.: 09/077,193
[22] PCT Filed: Oct. 16, 1997
[86] PCT No.: PCT/DE97/02376
  § 371 Date: May 26, 1998
  § 102(e) Date: May 26, 1998
[87] PCT Pub. No.: WO98/17561
  PCT Pub. Date: Apr. 30, 1998

[30] Foreign Application Priority Data

Oct. 19, 1996 [DE] Germany .............................. 196 43 248

[51] Int. Cl.[7] .................... F16J 15/46; F16K 1/22
[52] U.S. Cl. ................ 277/642; 277/646; 251/306
[58] Field of Search ........................ 220/591; 222/378, 222/803; 414/217; 277/605, 616, 626, 642, 645, 646; 251/175, 173, 306, 174; 137/614.01

[56] References Cited

U.S. PATENT DOCUMENTS

| | | | |
|---|---|---|---|
| 794,987 | 7/1905 | Kneuper | 277/646 |
| 1,813,126 | 11/1931 | Sheppard | 251/173 |
| 3,171,381 | 3/1965 | Meek | 277/646 |
| 3,202,170 | 11/1962 | Holbrook | 251/367 |
| 3,534,939 | 10/1970 | Frazier | 251/306 |
| 3,837,616 | 9/1974 | Castriota-Scanderbeg | 251/306 |
| 4,135,698 | 1/1979 | Thate et al. . | |
| 5,540,266 | 7/1996 | Grau et al. . | |

FOREIGN PATENT DOCUMENTS

| | | |
|---|---|---|
| 2 230 548 | 12/1974 | France . |
| 2 640 598 | 6/1990 | France . |
| 43 42 962 | 2/1995 | Germany . |
| 195 20 409 | 10/1996 | Germany . |
| 0 447 023 | 9/1991 | United Kingdom . |

*Primary Examiner*—Anthony Knight
*Assistant Examiner*—Vishal Patel
*Attorney, Agent, or Firm*—Jacobson, Price, Holman & Stern, PLLC

[57] ABSTRACT

A sealing system for a closing flap in a passage orifice of a facility where, in a coupled position, the closing flap rests in parallel against an identical closing flap on another facility in a sealing plane and cooperates therewith in such a way that the interiors of the two facilities are connected to one another. In a closed position, the individual closing flap has a seal on its circumference for sealing off an associated passage orifice. At least one of the two cooperating closing flaps has, on its circumference, a groove which is delimited on both sides by annular legs. A first leg delimits the groove toward the interior of the respective facility and extends near to the sealing surface of the passage orifice. The second leg is radially shortened relative to the first leg. Located on the seal, in the region radially outside the shortened leg, is an elastic bead which axially overlaps the shortened leg and, when the facilities are in the uncoupled position, at least partially projects beyond the sealing plane. The seal can be subjected to a pressure medium from inside.

5 Claims, 3 Drawing Sheets

SEALING SYSTEM FOR A CLOSING FLAP ON A PASSAGE ORIFICE

TECHNICAL FIELD

The invention relates to a sealing system for a closing flap on a passage orifice of a facility, said flap being suitable for cooperating with identical closing flaps on other facilities, in such a way that, when the facilities are in the coupled position, said closing flaps rest against one another and can be opened jointly, so that the interiors of the two facilities can be connected to one another.

BACKGROUND OF THE INVENTION

Facilities, in this case, may be transport or storage containers, transfer facilities or machine tools or processing machines and the like.

The products which are transported or transferred by means of or in facilities of this type are mostly flowable, for example particulate, liquid or pasty commodities. In this case, the commodities are often products having an active substance and/or an adjuvant for the production of a drug or of other chemical products, which may lead to adverse effects in the environment and, in particular, in humans. It is therefore necessary for these commodities to be treated, transported and transferred, if possible sealed off essentially hermetically.

The prior art discloses various closing flaps or closing flap systems, by means of which, on the one hand, the individual facilities can be sealed off in isolation and, on the other hand, after the cooperating facilities have been coupled, the closing flaps of the two facilities can be brought jointly in parallel, about a common axis, into an opening position.

DE 43 42 962 C1 specifies a device for the coupling of two containers, in which a closing flap is present on each of two identical tubular connection pieces for the purpose of transferring a commodity between the two containers. When the containers are each in isolation, the closing flaps are clamped in elastic annular seals, so-called sealing beads, on the end faces of the tubular connection pieces and seal off the containers. In the coupled position, when the two housings butt against one another with the end faces of their tubular connection pieces, the sealing beads are deformed in such a way that the clamping effect of the sealing beads relative to the closing flaps, which lie sealingly on one another in this position, is reduced. The closing flaps can subsequently be jointly rotated in the tubular connection pieces, the pivot axes of the two flaps lying in a common axis.

DE 195 20 409 C1 specifies a device for the coupling of containers to a blowing and suckaway means, in which an elastic sealing bead surrounds the end face of a tubular connection piece, the said sealing bead resting against the circumference of the closing flap, when the latter is in the closing position, in order to seal off relative to the passage orifice. The closing flap can be brought into a position coupled to an identical closing flap of a second facility, in the coupled position the elastic sealing bead resting in one sealing plane against the corresponding elastic sealing bead of the second facility.

Since there is no seal between the closing flaps, a transferred commodity can pass between the closing flaps when the latter are in the opened position. Since, in the coupled position, the elastic bead at least partially projects above the sealing plane and a buffer chamber is obtained between the closing flaps, this commodity can, after transfer, be blown out by a blowing means.

It has also already been proposed to seal off the closing flaps relative to the respective passage orifices in such a way that there is, on the circumference of the closing flaps, a seal which, in the closing position, is pressed by means of internal excess pressure onto the respective sealing face of the passage orifice. In this case, the seal is located in a groove of the closing flaps. A solution of this type is illustrated in FIG. 1 and is briefly described prior to the exemplary embodiment.

The disadvantage of the known solutions is that in the region of the outer circumference of the closing flaps, between the individual seals, there are annular gaps, in which transferred commodity may settle, said commodity entering the environment undesirably after the corresponding facilities or containers have been uncoupled.

SUMMARY OF THE INVENTION

The object on which the invention is based is to specify a sealing system for a closing flap on a passage orifice, of the type mentioned in the introduction, which is suitable for cooperating with identical closing flaps on other facilities, no annular gaps, in which residues of the transported or transferred commodity may settle, being formed between the closing flaps and relative to the respective facilities in the region of the outer circumference of the closing flaps when the latter are in the coupled and closed position.

The essence of the invention is that, in the noncoupled, but closed position, in which the outer faces of the closing flap and the outer sealing faces on the associated facilities lie in one plane, the sealing plane, the seal on the closing flap axially projects with an elastic bead beyond this plane.

When the corresponding facilities are coupled to one another, the elastic bead is pressed back into the sealing plane, the seal, together with the bead, being positively deformed in such a way that all design-related annular gaps in the outer region of the two closing flaps, resting against one another in parallel, relative to the sealing face in the passage orifice are filled with the seal. This ensures that, when the closing flaps are in the open position, there is no space in which transferred commodity may settle.

The seal is designed in such a way that, even after the two facilities have been coupled, that is to say after the seal, together with the bead, has been deformed due to the closing flaps being pressed against one another, the closing flaps can be actuated easily. The deformation of the seal should not lead to such high pressure on the passage orifice that the closing flap can be opened only with a great deal of effort.

In the simplest version, the seal may consist of soft solid rubber or elastomer.

The seal is designed in such a way that in the state of rest, that is to say without internal excess pressure, said seal is not in contact or in contact only in the manner of a lip seal with the sealing face in the passage orifice. Frictionless or low-friction movement of the closing flaps is consequently possible. The closing flaps are sealed off relative to the passage orifice solely under the effect of a pressure medium acting from inside. When the corresponding facilities are being coupled, the elastic bead on the seal is deformed essentially likewise in the way described. In the exemplary embodiment, this form of design is illustrated in more detail.

The seal is designed in such a way that, when the two facilities are in the coupled position and after the two closing flaps have come together, said seal seals on all sides and fills the free spaces in the sealing region. Only when the closing flaps are to be opened is a vacuum generated inside the seal, so that the sealing force is reduced or canceled in such a way that the closing flaps can be actuated.

The design of the seal may also be modified within the scope of the invention. Thus, the seal may have annular elastic strips which may perform further sealing functions or else holding functions. In this case, the seal may surround the entire outer surface of the closing flap. It is essential to the invention that the seal be sufficiently supported relative to the interior of the facility and that the bead on the seal is deformed to the extent according to the invention when the two cooperating closing flaps come together.

The advantage of the invention is essentially that, according to the set object, after the two corresponding facilities have been coupled for the transfer of a flowable commodity and have been uncoupled again, virtually no commodity of this kind can enter the environment.

The invention will be explained in more detail below in an exemplary embodiment. A solution according to the prior art is illustrated beforehand for explanatory purposes.

DESCRIPTION OF THE PREFERRED EMBODIMENTS

Solution According to the Prior Art

Figure 1:
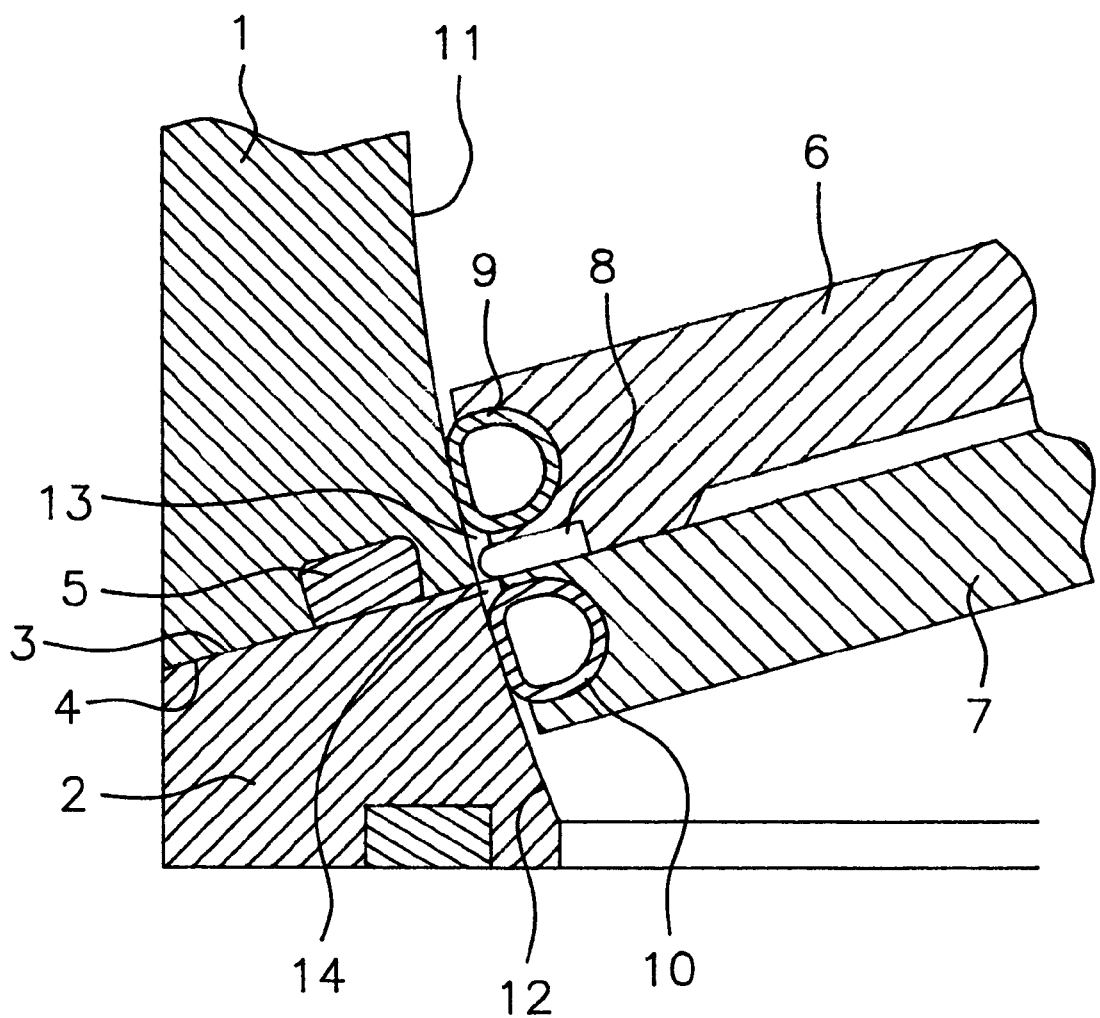
FIG. 1 shows a pair of prior art sealing flaps in a closed and coupled position.

The state of the art illustrated in FIG. 1 serves to explain the invention. In this case, two different facilities 1 and 2 are coupled to one another. A sealing ring 5 is located between the plane sealing faces 3 and 4. The two closing flaps 6 and 7 also rest against one another in the plane of the sealing faces 3 and 4. The two closing flaps 6 and 7 are sealed off relative to one another at the outer edge by means of a flat ring seal 8. Located in corresponding grooves on the circumference of the closing flaps 6 and 7 are the seals 9 and 10 which in the closed position, both in the coupled position and in the isolated position of the respective facility 1 or 2, can be subjected to internal excess pressure and, as illustrated in FIG. 1, come to rest against the spherical sealing faces 11 and 12. In this state of the art, the inter-connected annular gaps 13 and 14 necessarily occur, by virtue of design, as free spaces. When the closing flaps 6 and 7 are jointly pivoted in order to open them, transferred commodity settles in the spaces 13 and 14 and, when the closing flaps are subsequently closed and the two facilities 1 and 2 are separated from one another, may enter the environment, without being impeded.

Exemplary Embodiment

FIGS. 2 to 5 illustrate an exemplary embodiment of the sealing system according to the invention in various positions.

Figure 2:
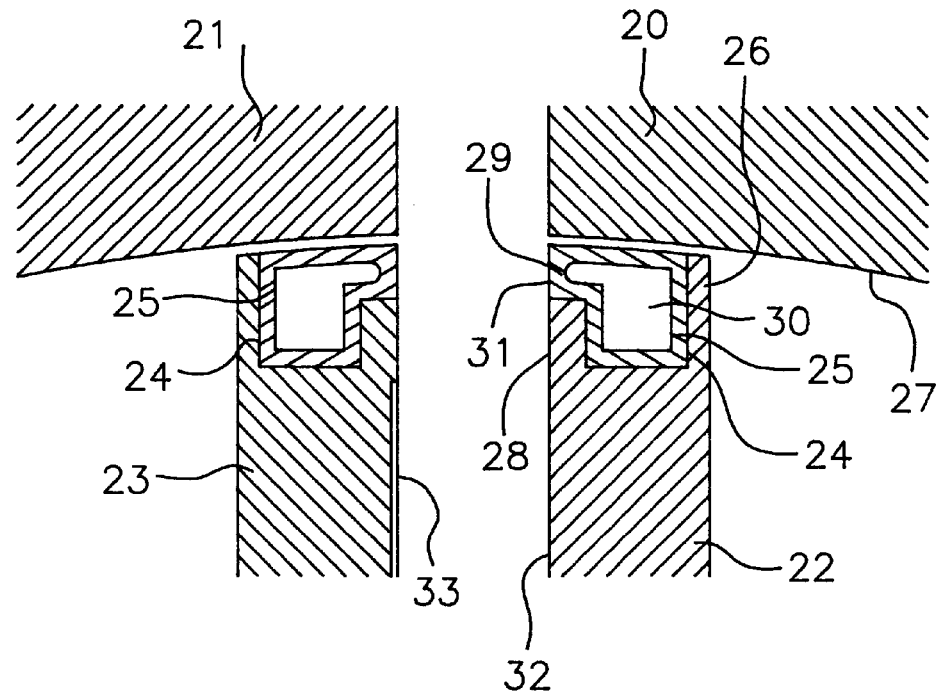
FIG. 2 is a detail of two closing flaps in the passage orifice where the facilities are uncoupled.

In FIG. 2, two different facilities 20 and 21, which may, for example, be a transport container and a storage container or a supply container and a processing facility, are illustrated in the uncoupled position. A closing flap 22 is associated with the facility 20 and a closing flap 23 with the facility 21. In an equivalent way, a groove 24 is worked in on the circumference of the individual closing flaps 22 and 23, the seal 25 according to the invention being held in said groove.

The design according to the invention of the sealing system is explained in more detail by the example of the closing flap 22. The groove 24 has, toward the interior of the facility 20, a leg 26 which extends near to the spherical sealing face 27 in the passage orifice. The leg 26 is not to come in contact with the sealing face 27 during the movement of the closing flap 22, but the seal 25 is to be supported over a large area on this side.

On the other side of the groove 24, the corresponding leg 28 is of radially shortened design. The seal 25 fills the entire groove 24. According to the invention, the seal 25 has a bead 29 which overlaps the radially shortened leg 28 along the axial length of the passage orifice.

The seal 25 is of hollow design, the cavity 30 also encroaching into the bead 29. In the example, an oblique sealing face 31 is designed on the bead 29, in such a way that the sealing face 31 projects relative to the outer face 32 of the closing flap 22 further in the radially outer region than in the inner region. In the state of rest illustrated, the seal 25 is at a short distance from the sealing face 27 in the passage orifice.

Figure 3:
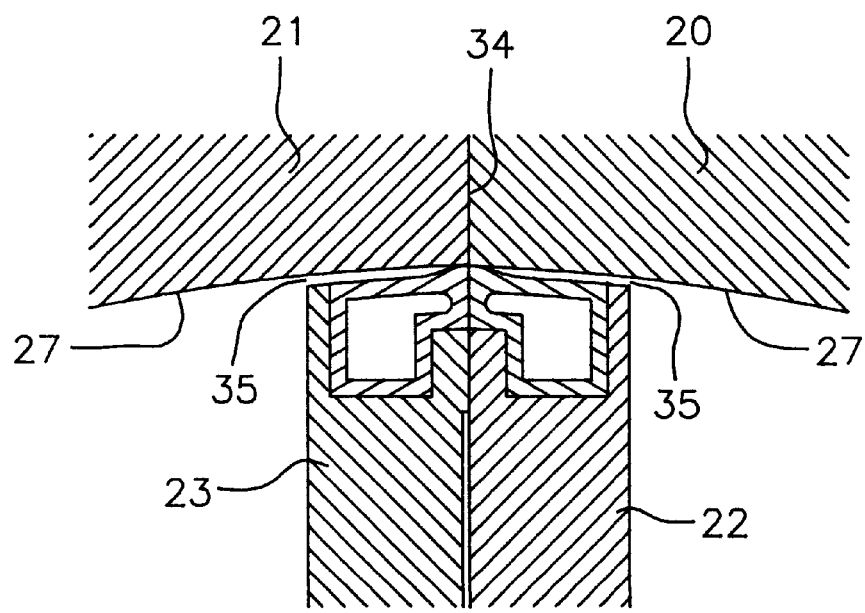
FIG. 3 is a detail of two closing flaps where the facilities are coupled.

In FIG. 3, the two facilities 20 and 21 have been moved against one another and coupled to one another. The closing flaps 22 and 23 rest sealingly with their faces 32 and 33 on one another in the sealing plane 34. In this case, the beads 29 on the two seals 25 are deformed in such a way that said beads rest sealingly on one another and jointly extend outward up to the spherical sealing face 27. The deformation is only such that the two seals 25 rest lightly against the sealing faces 27 in the region of the contact plane 34. In this case, the sealing force relative to the sealing faces 27 is, in the manner of a lip seal, so slight that the closing flaps 22 and 23 can easily be pivoted jointly, so that the respective commodity is allowed to flow through. The common outer surface of the closing flaps 22 and 23 resting against one another, including the two seals 25, does not have any appreciable annular gaps.

In comparison with the state of the art, as was illustrated in FIG. 1, it can be clearly seen in FIG. 3 that there are no spaces similar to the annular gaps 13 or 14 in FIG. 1.

When the closing flaps 22 and 23, after being opened, are pivoted again into the closing position, although transferred commodity may settle in the inwardly open spaces 35, it does not escape outward after the closing of the closing flaps 22 and 23 and therefore also cannot pollute the environment.

Figure 4:
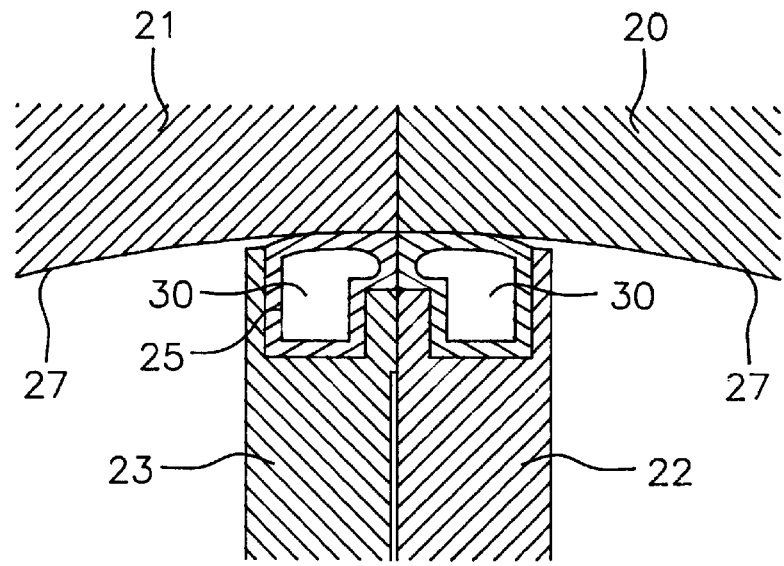
FIG. 4 is a detail of two closing flaps where the facilities are coupled with the interiors of the seals subjected to a pressure medium.

FIG. 4 shows the position of the seals 25 in the closing position of the closing flaps 22 and 23, before the facilities 20 and 21 are separated from one another. In this position, a pressure medium, for example compressed air has been introduced into the cavity 30 within the seal 25, and the latter is pressed with high sealing force and with its entire outer surface against the respective sealing face 27.

In this phase, settled commodity, which was present in the spaces 35 according to FIG. 3, has been forced away or jammed harmlessly between the seals 25 and the sealing face 27.

Figure 5:
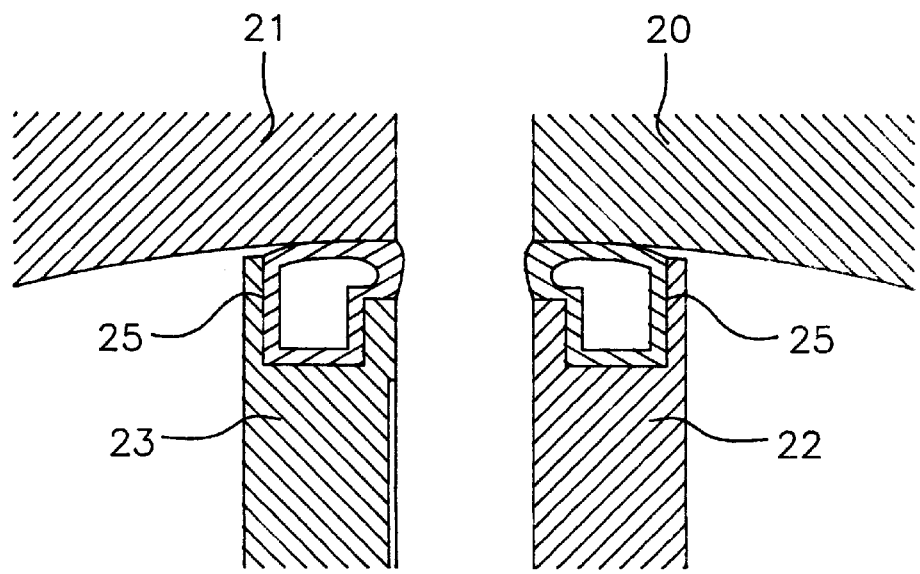
FIG. 5 is a detail of FIG. 4 in the uncoupled position.

FIG. 5 illustrates the position of the seals 25 according to FIG. 4, but the two facilities 20 and 21 have been separated from one another. In this position, the closing flaps 22 and 23 ensure the closure of the passage orifices of the facilities 20 and 21 which are in the isolated position.

What is claimed is:

1. Sealing system for a closing flap in a passage orifice of a facility wherein said closing flap may lie in parallel against an identical closing flap on another facility in a sealing plane and cooperate therewith when said facilities are coupled to each other in such a way that the interiors of the two facilities can be connected to one another and wherein said closing flap has a seal on its circumference such that, in at least a closed and coupled position, said closing flap seals off said passage orifice, wherein the improvement comprises said closing flap having, on the circumference, a groove which is defined by first and second annular legs, the first leg which, in a closed position, extends radially near to a sealing surface of the passage orifice, and the second leg being radially shortened relative to said first leg, and wherein said seal has, in the region radially outside the shortened second leg, an elastic bead which axially overlaps the shortened second leg such that when the facilities are in the uncoupled position, said elastic bead projects at least partially, beyond said sealing plane.

2. Sealing system according to claim 1, wherein said seal can be subjected internally to a pressure medium such that, when the closing flap is in the closed position, the seal can be pressed with its entire circumference onto the sealing surface of the associated passage orifice.

3. Sealing system according to claim 2, wherein an interior space for the pressure medium within the seal extends into the elastic bead.

4. Sealing system according to claim 1, wherein when the closing flap is in the closed position, the seal rests with the entire circumference of said seal against the sealing surface of the associated passage orifice, wherein an interior of the seal can be at a vacuum such that the seal does not significantly rest against the surface of the associated passage orifice.

5. Sealing system according to claim 1, wherein said seal is an elastic annular seal.

\* \* \* \* \*